US012580324B2

(12) United States Patent
Sudo

(10) Patent No.: US 12,580,324 B2
(45) Date of Patent: Mar. 17, 2026

(54) ANTENNA MODULE WITH DIELECTRIC LENS

(71) Applicant: Murata Manufacturing Co., Ltd., Nagaokakyo (JP)

(72) Inventor: Kaoru Sudo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 154 days.

(21) Appl. No.: 18/453,340

(22) Filed: Aug. 22, 2023

(65) Prior Publication Data

US 2024/0022005 A1 Jan. 18, 2024

Related U.S. Application Data

(63) Continuation of application No. PCT/JP2022/005881, filed on Feb. 15, 2022.

(30) Foreign Application Priority Data

Mar. 5, 2021 (JP) ................................ 2021-035358

(51) Int. Cl.

*H01Q 19/06* (2006.01)
*H01Q 1/40* (2006.01)
(Continued)

(52) U.S. Cl.

CPC ............... *H01Q 19/06* (2013.01); *H01Q 1/40* (2013.01); *H01Q 9/0407* (2013.01);
(Continued)

(58) Field of Classification Search

CPC ...... H01Q 19/06; H01Q 9/0407; H01Q 15/08; H01Q 23/00; H01Q 1/22; H01Q 1/40; H01Q 15/0086; H01Q 19/062

See application file for complete search history.

(56) References Cited

U.S. PATENT DOCUMENTS 5,955,752 A * 9/1999 Fukaya .................... H01Q 1/42 257/664
6,518,932 B1 * 2/2003 Matsui ..................... H01Q 1/42 343/770

(Continued)

FOREIGN PATENT DOCUMENTS

JP H11-004118 A 1/1999
JP 2003-315438 A 11/2003

(Continued)

OTHER PUBLICATIONS

International Search Report and Written Opinion mailed on Apr. 26, 2022, received for PCT Application PCT/JP2022/005881, filed on Feb. 15, 2022, 9 pages including English Translation.

*Primary Examiner* — Dimary S Lopez Cruz
*Assistant Examiner* — Yonchan J Kim
(74) *Attorney, Agent, or Firm* — XSENSUS LLP

(57) ABSTRACT

An antenna module includes a mounting board with a flat plate shape, and a power supply circuit to supply a radio frequency signal. The power supply circuit is mounted on the mounting board, and a radiating electrode is arranged on the power supply circuit. A dielectric fills a region around the power supply circuit and the radiating electrode. A conductive layer covers at least part of the dielectric. In the dielectric, a lens part is formed at a position overlapping the radiating electrode in plan view of the mounting board. The dielectric includes a first region in which the lens part is formed and a second region other than the first region, and the conductive layer is formed in the second region.

11 Claims, 6 Drawing Sheets

(51) Int. Cl.
*H01Q 9/04* (2006.01)
*H01Q 15/08* (2006.01)
*H01Q 23/00* (2006.01)

(52) U.S. Cl.
CPC ........... *H01Q 15/08* (2013.01); *H01Q 19/062* (2013.01); *H01Q 23/00* (2013.01)

(56) References Cited

U.S. PATENT DOCUMENTS

| | | | | |
|---|---|---|---|---|
| 2004/0160357 | A1* | 8/2004 | Nagasaku | G01S 7/032 342/175 |
| 2014/0110841 | A1* | 4/2014 | Beer | H01Q 9/16 257/738 |
| 2015/0325922 | A1* | 11/2015 | Fujita | H01Q 3/16 343/753 |
| 2021/0143533 | A1* | 5/2021 | Nagaishi | H01Q 1/422 |
| 2022/0045439 | A1* | 2/2022 | Fillion | G10K 11/346 |

FOREIGN PATENT DOCUMENTS

| | | | |
|---|---|---|---|
| JP | 2015-213285 | A | 11/2015 |
| JP | 2015-537188 | A | 12/2015 |

* cited by examiner

100

ANTENNA MODULE WITH DIELECTRIC LENS

CROSS-REFERENCE TO RELATED APPLICATIONS

This application is a continuation of, and claims priority to, international application no. PCT/JP2022/005881, filed Feb. 15, 2022, and which claims priority to Japanese application no. JP 2021-035358, filed Mar. 5, 2021. The entire contents of both prior applications are hereby incorporated by reference.

TECHNICAL FIELD

The present disclosure relates to an antenna module including a lens and a technique for improving characteristics of an antenna.

BACKGROUND ART

A configuration of a radio unit may include a convex lens.

For example, a radio unit may include a radio unit substrate including an antenna element. The radio unit substrate is accommodated in a housing. The housing has an opening in a direction in which the antenna element radiates radio waves, and a lens is placed in the opening.

In such a radio unit, a desired directivity can be achieved by using the lens to change a path of radio waves radiated from the antenna element.

CITATION LIST

Patent Document

Patent Document 1 Japanese Unexamined Patent Application Publication No. 2015-213285

SUMMARY

Technical Problem

In the conventional radio unit, an air layer is formed between the antenna element and the lens. In this case, at the interface between the air layer and the lens, impedance mismatching occurs due to a difference in permittivity, which may cause reflection of radio waves. Thus, the gain of the antenna may decrease.

A solution provided by the present disclosure is to, in an antenna module including a lens, suppress impedance mismatching caused by the lens and improve characteristics of an antenna.

Solution

An antenna module according to exemplary aspects of the disclosure includes a mounting board with a flat plate shape, and a power supply circuit to supply a radio frequency signal. The power supply circuit is mounted on the mounting board, and a radiating electrode is arranged on the power supply circuit. A dielectric fills a region around the power supply circuit and the radiating electrode. A conductive layer covers at least part of the dielectric. In the dielectric, a lens part is formed at a position overlapping the radiating electrode in plan view of the mounting board. The dielectric includes a first region in which the lens part is formed and a second region other than the first region, and the conductive layer is formed in the second region.

Effects of the Disclosure

In the antenna module according to the present disclosure including a lens, a dielectric that is integrated with a lens part is arranged on a radiating electrode. The dielectric is filled in a region between a power supply circuit and the radiating electrode. With this arrangement, in the region from an antenna element from which a radio wave is radiated to a lens where the radio wave reaches, permittivity does not change significantly. Thus, the characteristics of the antenna can be improved while occurrence of impedance mismatching being prevented.

DESCRIPTION OF EMBODIMENTS

Figure 1:
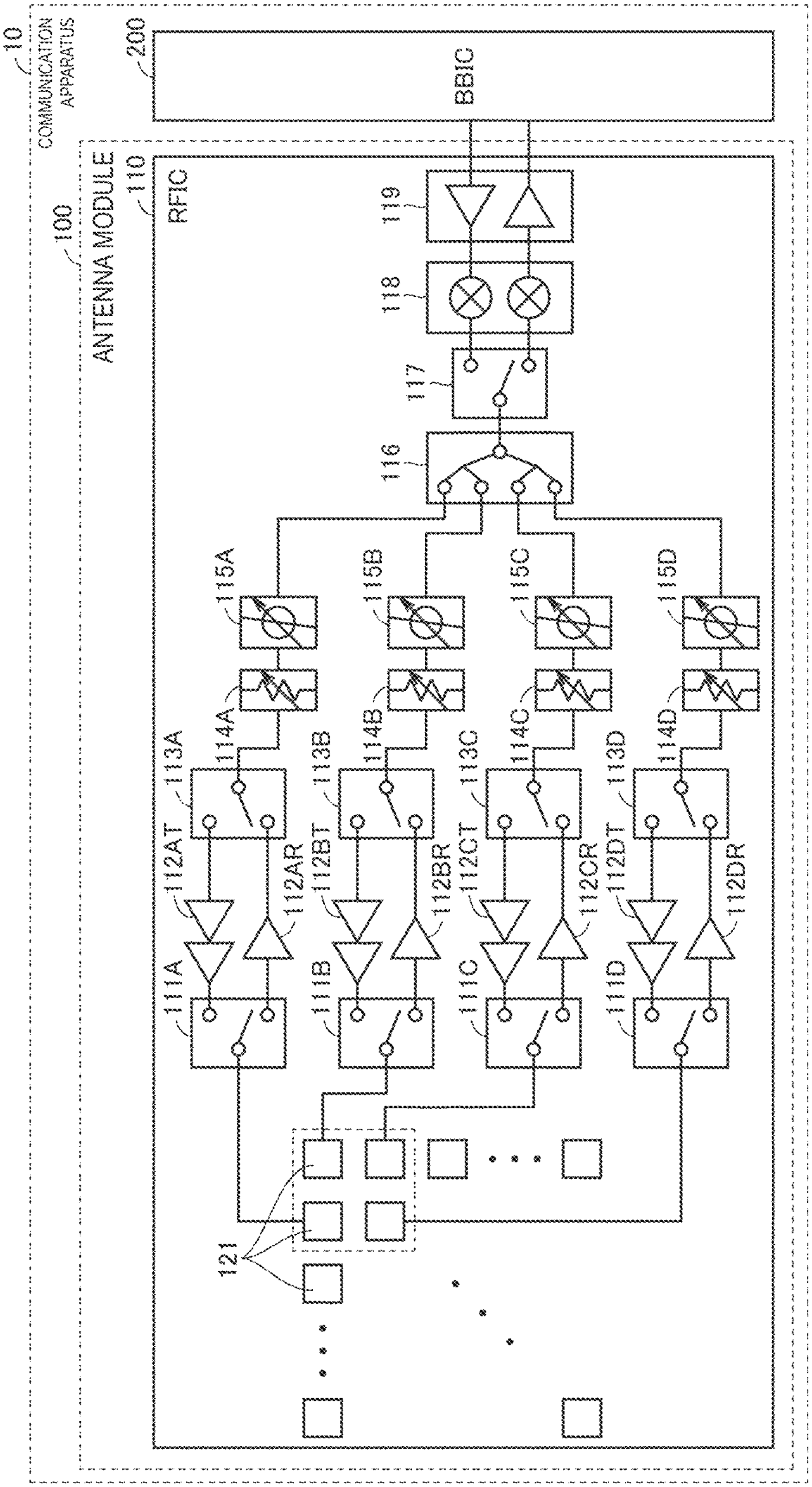
FIG. 1 is an example of a block diagram of a communication apparatus according to a first exemplary embodiment.

Hereinafter, exemplary embodiments of the present disclosure will be described in detail with reference to drawings. In the drawings, the same or corresponding parts are denoted by the same signs and repetitive description of those parts will be omitted.

FIRST EMBODIMENT

Basic Configuration of Communication Apparatus

FIG. 1 is an example of a block diagram of a communication apparatus 10 according to a first exemplary embodiment. The communication apparatus 10 is, for example, a mobile terminal such as a mobile phone, a smartphone, or a tablet, a personal computer including a communication function, a base station, smart glasses, or the like. Frequency bands of radio waves used for an antenna module 100 according to the first embodiment are, for example, millimeter wave bands with center frequencies of 28 GHz, 39 GHz, 60 GHz, and the like. However, radio waves in other frequency bands can also be used.

Referring to FIG. 1, the communication apparatus 10 includes the antenna module 100 and a BBIC 200 that configures a baseband signal processing circuit. The antenna module 100 includes an RFIC 110 for supplying radio frequency signals. The communication apparatus 10 up-converts, at the RFIC 110, a signal transmitted from the BBIC 200 to the antenna module 100 into a radio frequency signal, and radiates the radio frequency signal through a radiating electrode 121. Furthermore, the communication apparatus 10 transmits a radio frequency signal received at the radiating electrode 121 to the RFIC 110, performs down-conversion of the radio frequency signal, and processes the down-converted signal at the BBIC 200.

In FIG. 1, for the sake of simplicity, configurations corresponding to only four radiating electrodes 121 among a plurality of radiating electrodes 121 included in the antenna module 100 are illustrated, and illustration of configurations corresponding to the other radiating electrodes 121, which have configurations similar to those of the illustrated four radiating electrodes 121, are omitted. In FIG. 1, an example in which the plurality of radiating electrodes 121 are arranged in a two-dimensional array shape is illustrated. However, the plurality of radiating electrodes 121 are not necessarily provided. The antenna module 100 may include only one radiating electrode 121. Furthermore, the plurality of radiating electrodes 121 may be arranged in a one-dimensional array in which the plurality of radiating electrodes 121 are arranged in a line. In the first exemplary embodiment, an example in which a radiating electrode 121 is a patch antenna having a substantially square flat plate-like shape will be explained. However, the shape of the radiating electrode 121 may be a circular shape, an elliptical shape, or a polygonal shape such as a hexagonal shape.

The RFIC 110 includes switches 111A to 111D, 113A to 113D, and 117, power amplifiers 112AT to 112DT, low noise amplifiers 112AR to 112DR, attenuators 114A to 114D, phase shifters 115A to 115D, a signal multiplexer/demultiplexer 116, a mixer 118, and an amplifier circuit 119.

For transmission of a radio frequency signal, the switches 111A to 111D and 113A to 113D are switched to the power amplifiers 112AT to 112DT side and the switch 117 is connected to a transmission-side amplifier in the amplifier circuit 119. For reception of a radio frequency signal, the switches 111A to 111D and 113A to 113D are switched to the low noise amplifiers 112AR to 112DR side and the switch 117 is connected to a reception-side amplifier in the amplifier circuit 119.

A signal transmitted from the BBIC 200 is amplified at the amplifier circuit 119 and then up-converted at the mixer 118. A transmission signal, which is an up-converted radio frequency signal, is demultiplexed into four signals by the signal multiplexer/demultiplexer 116. The four signals pass through corresponding signal paths and are supplied to corresponding radiating electrodes 121. At this time, since the degrees of phase shift of the phase shifters 115A to 115D that are arranged on corresponding signal paths are adjusted individually, the directivities of the radiating electrodes 121 can be adjusted. Furthermore, the attenuators 114A to 114D adjust strengths of transmission signals.

Four reception signals, which are radio frequency signals received at the corresponding radiating electrodes 121, pass through corresponding signal paths and are multiplexed by the signal multiplexer/demultiplexer 116. The multiplexed reception signal is down-converted by the mixer 118, is amplified by the amplifier circuit 119, and is transmitted to the BBIC 200.

The RFIC 110 is, for example, formed as a one-chip integrated circuit component including the circuit configuration described above. Alternatively, for each of the radiating electrode 121 in the RFIC 110, devices (a switch, a power amplifier, a low noise amplifier, an attenuator, and a phase shifter) corresponding to the radiating electrode 121 may be formed as a one-chip integrated circuit component.

Structure of Antenna Module

Figure 2:
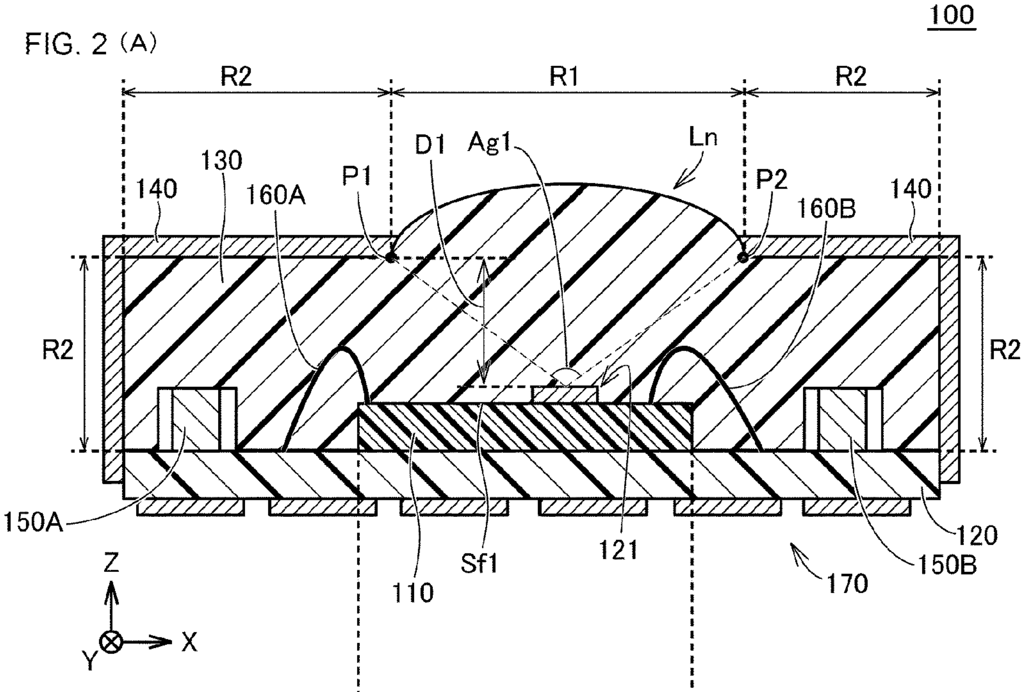
FIG. 2(A) is a cross-section view (FIG. 2(A)) of an antenna module according to the first exemplary embodiment.
FIG. 2(B) is a plan view of an RFIC and a radiating electrode in FIG. 2(A).
Figure 2:
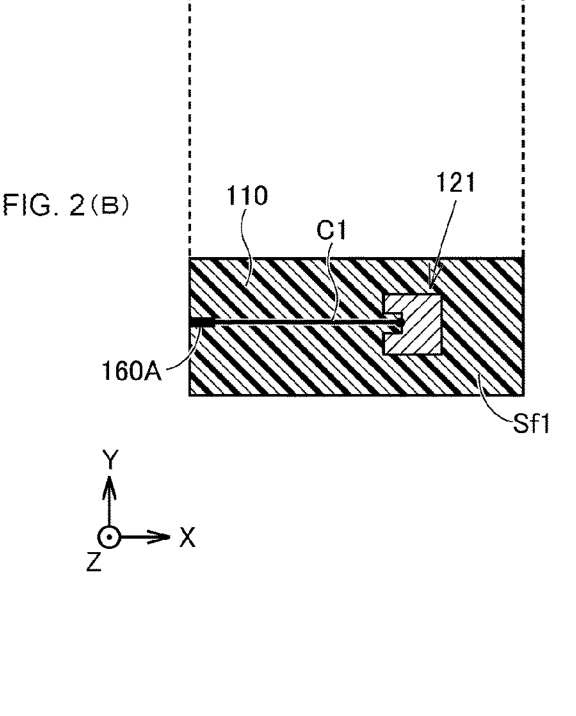

Next, the details of the antenna module 100 in FIG. 1 will be described with reference to FIG. 2. FIG. 2 includes a cross-section view (FIG. 2(A)) of the antenna module 100 according to the first embodiment and a plan view (FIG. 2(B)) of the RFIC 110 and a radiating electrode 121 in FIG. 2(A).

As illustrated in FIG. 2(A), the antenna module 100 is a lens antenna including a lens Ln. The antenna module 100 includes a mounting board 120 with a flat plate-like shape, the RFIC 110, and a mold resin 130. The lens Ln, which has a convex shape, is formed in the mold resin 130. The lens Ln has a hemispherical shape arranged to protrude from the mold resin 130. The shape of the lens Ln is not necessarily a convex shape and may be a concave shape.

Hereinafter, the thickness direction of the mounting board 120 will be defined as a Z-axis direction, and planes perpendicular to the Z-axis direction will be defined as an X-axis and a Y-axis. Furthermore, in each drawing, a Z-axis positive direction may be referred to as a top side, and a Z-axis negative direction may be referred to as a bottom side. The mold resin 130 corresponds to a "dielectric" in the present disclosure, and the RFIC 110 corresponds to a "power supply circuit" in the present disclosure.

The RFIC 110, an electronic component 150A, and an electronic component 150B are mounted on a surface of the mounting board 120 on the Z-axis positive direction side. The RFIC 110 includes a semiconductor substrate made of silicone or the like, a conductor layer, a dielectric layer, a protection film, and the like. Furthermore, a radiating electrode 121 is arranged on a surface Sf1 of the RFIC 110 on the Z-axis positive direction side. In the antenna module 100 according to the first embodiment, the radiating electrode 121 is formed of a single radiating element. The mounting board 120 is electrically connected to the RFIC 110 by bonding wires 160A and 160B. As illustrated in FIG. 2, the bonding wires 160A and 160B are connected to the surface of the mounting board 120 on the Z-axis positive direction side and the surface Sf1 of the RFIC 110. That is, the mounting board 120 is electrically connected to the RFIC 110. Such a configuration in which the radiating electrode 121 is arranged on the same surface as the surface Sf1 that connects to the bonding wires 160A and 160B may be called a face-up configuration. The surface Sf1 corresponds to a "first surface" in the present disclosure.

As illustrated in FIG. 2(B), on the surface Sf1 of the RFIC 110, a wire C1 that allows connection between the radiating electrode 121 and the bonding wire 160A is arranged. The wire C1 may be arranged on a layer closer to the Z-axis negative direction side than the surface Sf1 of the RFIC 110 is. In this case, due to capacitance coupling between the wire C1 and the bonding wire 160A, a radio frequency signal may be transmitted through the wire C1 to the radiating electrode 121. Furthermore, due to capacitance coupling between the wire C1 and the radiating electrode 121, a radio frequency signal may be transmitted through the wire C1 to the radiating electrode 121. Power supply to the radiating electrode 121 is not necessarily implemented in a method using a bonding wire and may be implemented using an Si through electrode (TSV: Through-Silicon Via). That is, the radiating electrode 121 may be connected to the mounting board 120 with a through electrode, which passes through the RFIC 110, interposed therebetween.

A plurality of connection terminals 170 are formed on a surface of the mounting board 120 on the Z-axis negative direction side. In the example of FIG. 2, six connection terminals 170 are provided.

The mold resin 130 is disposed on the mounting board 120 on the Z-axis positive direction side. That is, the mold resin 130 covers the radiating electrode 121. Thus, an electronic component and the like mounted on the mounting board 120 are fixed, and mechanical strength increases. A base material forming the mold resin 130 is, for example, a thermosetting resin such as an epoxy resin. The base material forming the mold resin 130 may be a different material.

The lens Ln with the convex shape is formed at a position in the mold resin 130 that overlaps with the radiating electrode 121 in plan view of the mounting board 120. The peripheral edge of the lens Ln has a circular shape in plan view of the mounting board 120. The peripheral edge of the lens Ln in plan view of the mounting board 120 may have a shape other than a circular shape.

The mold resin 130 including the lens Ln is formed using a mold. For example, a shape of the lens Ln is formed in the mold. By pouring resin into the mold and solidifying the resin, the mold resin 130 including the lens Ln is formed.

The lens Ln improves the convergence of a radio frequency signal radiated from the radiating electrode 121. In other words, the lens Ln changes the beam shape of a radio frequency signal radiated from the radiating electrode 121 and increases the gain. That is, the gain of the antenna module 100 in the case where the mold resin 130 includes the lens Ln is higher than that in the case where the mold resin 130 does not include the lens Ln. In the case where the lens Ln has a concave shape, the width of a beam is large.

In the antenna module 100, the mold resin 130 is formed in such a manner that the region between the lens Ln and the radiating electrode 121 is solid. Furthermore, in the example of FIG. 2, the mold resin 130 is formed of a single layer of resin with a uniform permittivity. Thus, the permittivity does not change significantly in the region between the lens Ln and the radiating electrode 121. Typically, radiated radio waves reflect when passing through a region in which the permittivity changes significantly. As the permittivity changes more significantly, radiated radio waves become more likely to reflect. That is, the gain of the antenna decreases. In the example of FIG. 2, since the mold resin 130 between the lens Ln and the radiating electrode 121 is formed of a single layer of resin with a uniform permittivity, radio waves radiated from the radiating electrode 121 are less likely to reflect. That is, an interface between objects having significantly different permittivities is not present between the lens Ln and the radiating electrode 121. The interface is, for example, a boundary between the mold resin 130 with a high permittivity and an air layer with a low permittivity and is a plane at which impedance mismatching occurs. In the antenna module 100, since an interface at which the permittivity changes significantly is not present, impedance mismatching can be suppressed, and reflection of radio waves can be suppressed.

As described above, in the antenna module 100 according to the first embodiment, the region between the radiating electrode 121 and the lens Ln is solid, and there is no interface between objects having significantly different permittivities in the mold resin 130. Thus, compared to the case where an air layer is formed between the radiating electrode 121 and the lens Ln, radio waves radiated from the radiating electrode 121 are less likely to reflect. That is, in the antenna module 100, a decrease in the gain of the antenna is suppressed. Thus, in the antenna module 100, the characteristics of the antenna improves.

In the Z-axis direction, the radiating electrode 121 and the lens Ln are separated from each other with a distance D1 therebetween. The distance D1 is equal to or longer than 1λ, where the wavelength of a radio frequency signal supplied from the RFIC 110 is represented by λ. Thus, the distance of radiation of radio waves from the lens Ln is longer than that in the case where the distance between the radiating electrode 121 and the lens Ln is less than 1λ. That is, in the antenna module 100, the function of the lens Ln improves.

In contrast, when the distance between the radiating electrode 121 and the lens Ln increases, the amount of radio waves having wavelengths that can resonate within the shield increases. In this case, unwanted resonance that interferes with radio waves radiated from the radiating electrode 121 is likely to be generated. Thus, in the antenna module 100, it is desirable that the distance D1 between the lens Ln and the radiating electrode 121 be equal to or more than 1λ and less than or equal to 10λ. Thus, in the antenna module 100, generation of unwanted resonance can be suppressed.

The mold resin 130 is covered by a sputter shield 140. A metal material including Cu is disposed on a surface of the mold resin by sputtering so that the sputter shield 140 is formed. The metal material forming the sputter shield may be a metal material including Au or Ag. The sputter shield 140 is formed to cover a region R2 of the mold resin 130 in which the lens Ln is not formed. In FIG. 2, for convenience of explanation, the region R2 only on an XY plane and a YZ plane of the mold resin 130 is illustrated. However, the region R2 also includes an XZ plane and corner parts and ridges forming planes of the mold resin 130.

That is, the sputter shield 140 is formed in the region R2. Furthermore, the sputter shield 140 does not cover a region R1 of the mold resin 130 in which the lens Ln is formed. In other words, the lens Ln is not covered by the sputter shield 140.

The bonding wire 160A illustrated in FIG. 2 is a wire that allows connection between the RFIC 110 and the BBIC 200, and a signal in an intermediate frequency band is transmitted through the bonding wire 160A. When a signal in the intermediate frequency band is transmitted through the bonding wire 160A, unwanted radio waves may be radiated from the bonding wire 160A. In the antenna module 100, the sputter shield 140 is arranged in a position overlapping with the bonding wire 160A in plan view of the mounting board 120. In other words, the bonding wire 160A is covered by the sputter shield 140. Thus, in the antenna module 100, a situation in which radio waves radiated from the bonding wire 160A are radiated to the outside of the antenna module 100 can be suppressed. Since the bonding wire 160B is a wire that allows connection to the ground potential, there is less need for the bonding wire 160B to be covered by the sputter shield 140. The sputter shield 140 corresponds to a "conductive layer" in the present disclosure.

As described above, the lens Ln has a circular shape in plan view of the mounting board 120. In the example of FIG. 2(A), at the edge of the lens Ln and at the peripheral edge of the lens Ln where the lens Ln having the convex shape and the sputter shield 140 are in contact with each other, an end portion P1 and an end portion P2 are illustrated. Since the lens Ln has a circular shape in plan view of the mounting board 120, the end portion P2 is an end portion that is farthest away from the end portion P1.

An angle Ag1 is an angle formed between a direction from the radiating electrode 121 toward the end portion P1 and a direction from the radiating electrode 121 toward the end portion P2. Typically, the angle of radiation from the radiating electrode 121, which is a patch antenna, is 120 degrees or less. If the lens Ln is disposed in such a manner that the angle Ag1 exceeds 120 degrees, the lens Ln has a region through which radio waves do not transmit. Therefore, in the antenna module 100, the radiating electrode 121 and the lens Ln are disposed in such a manner that the angle Ag1 formed between the direction from the radiating electrode 121 toward the end portion P1 and the direction from the radiating electrode 121 toward the end portion P2 does not exceed 120 degrees. Thus, an unnecessary increase in the dimension of the lens Ln, which is not covered by the sputter shield 140, is prevented. That is, radio waves radiated from the bonding wire 160A and the electronic components 150A and 150B are prevented from transmitting through the lens Ln and being radiated to the outside of the antenna module 100.

In FIG. 2(B), the radiating electrode 121 and the RFIC 110 viewed from the Z-axis positive direction side are illustrated. The radiating electrode 121 forms a patch antenna. The bonding wire 160A and the radiating electrode 121 are connected by wiring in a redistribution layer of the RFIC 110. The radiating electrode 121 is not necessarily disposed on the surface Sf1 of the RFIC 110 on the Z-axis positive direction side and may be formed in the redistribution layer of the RFIC 110.

The mold resin 130 in FIG. 2 is not necessarily formed of a uniform base material. For example, the mold resin 130 may be formed of gradual layers of a plurality of base materials. Base materials of individual layers forming the mold resin 130 are selected in such a manner that a difference in permittivity between adjacent base materials formed in layers falls within a predetermined range. Thus, reflection of radio waves between the base materials can be suppressed.

A layer forming the mold resin 130 that is closest to the Z-axis negative direction side and in contact with the radiating electrode 121 is formed of a first base material with a relatively high permittivity. A layer formed of a second base material with a permittivity that is lower than the permittivity of the first base material is arranged on the Z-axis positive direction side of the first base material. The difference between the permittivity of the first base material and the permittivity of the second base material is small enough not to form an interface at which radio waves reflect. Furthermore, a layer formed of a third base material with a permittivity that is lower than the permittivity of the second base material is arranged on the Z-axis positive direction side of the second base material. The difference between the permittivity of the second base material and the permittivity of the third base material is small enough not to form an interface at which radio waves reflect.

As described above, since the mold resin 130 includes gradual layers whose permittivities gradually decrease, generation of an interface at which the amount of reflection of radio waves is large in the region between the radiating electrode 121 and the lens Ln can be suppressed. In other words, the mold resin 130 includes a plurality of base materials that are formed in such a manner that permittivities of the plurality of base materials gradually change.

SECOND EMBODIMENT

The configuration of the antenna module 100 according to the first exemplary embodiment in which only the mold resin 130 is filled in the region between the RFIC 110 and the electronic component 150A or the electronic component 150B has been described above. In a second exemplary embodiment, a configuration of an antenna module 100A in which a conductive shield 180A is arranged between the electronic component 150A and the RFIC 110 and a conductive shield 180B is arranged between the electronic component 150B and the RFIC 110 will be described. Redundant description of components of the antenna module 100A according to the second exemplary embodiment that have been described above in the description of components of the antenna module 100 according to the first exemplary embodiment will be omitted.

Figure 3:
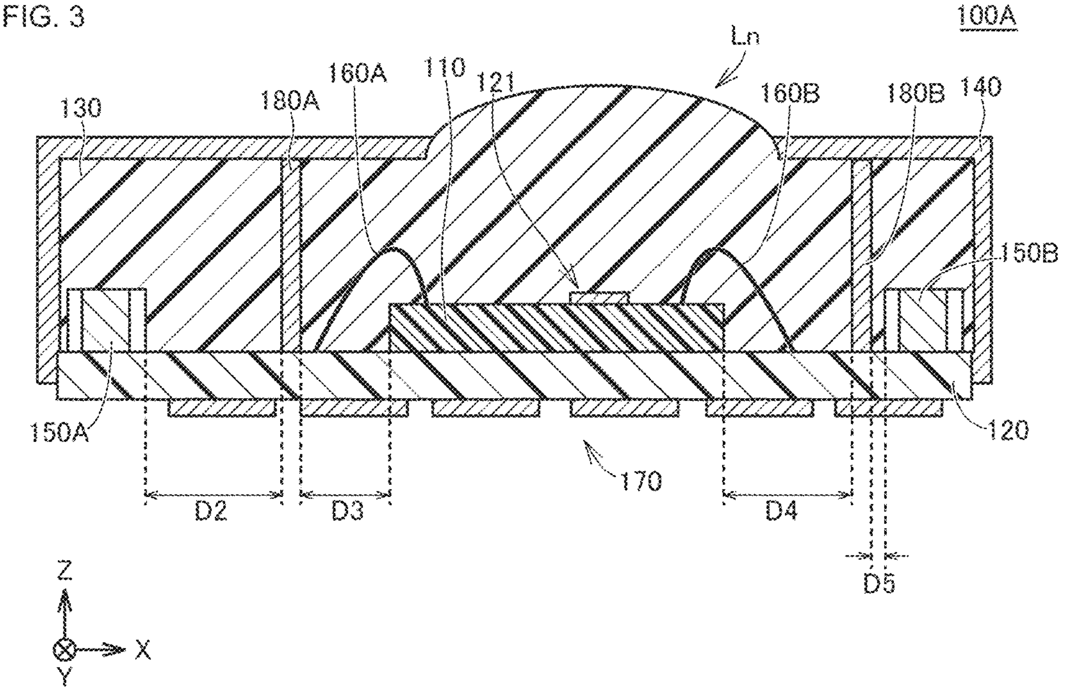
FIG. 3 is a cross-section view of an antenna module according to a second exemplary embodiment.

FIG. 3 is a cross-section view of the antenna module 100A according to the second exemplary embodiment. As illustrated in FIG. 3, the conductive shield 180A is arranged between the electronic component 150A and the RFIC 110. Furthermore, the conductive shield 180B is arranged between the electronic component 150B and the RFIC 110. The conductive shields 180A and 180B are each formed of a member having conductive characteristics. The conductive shields 180A and 180B are connected to the ground potential.

In the antenna module 100A illustrated in FIG. 3, the conductive shields 180A and 180B each have a wall-like shape. That is, the conductive shields 180A and 180B each have a length in the Y-axis direction, so that the region in which the mold resin 130 is filled is divided into three sections. Thus, the RFIC 110, the electronic component 150A, and the electronic component 150B are arranged in independent spaces isolated from one another by the conductive shields 180A and 180B. As illustrated in FIG. 3, it is desirable that the conductive shields 180A and 180B be arranged between the sputter shield 140 and the mounting board 120 and form independent spaces that are isolated from one another. However, openings may be formed in part of the conductive shields 180A and 180B.

The conductive shields 180A and 180B may have a shape other than the wall-like shape. For example, the conductive shields 180A and 180B may have a column-like shape, a wire-like shape, or a mesh-like shape. The column-like shape represents a shape of at least one bar-like shape arranged between the mounting board 120 and the sputter shield 140. In the case where the conductive shields 180A and 180B each have a column-like shape, although regions where the RFIC 110, the electronic component 150A, and the electronic component 150B are arranged are not completely isolated from one another, generation of noise can be suppressed and the cost of production can be reduced, compared to the case where the conductive shields 180A and 180B each have a wall-like shape. In the case where the conductive shields 180A and 180B each have a column-like shape, a plurality of columns may be arranged between the RFIC 110 and the electronic components 150A and 150B.

The wire-like shape represents a shape of at least one conductive wire thinner than the column-like shape. Compared to the case where the conductive shields 180A and 180B each having a column-like shape has a length in the Z-axis direction, it is desirable that a plurality of wires be arranged in the Y-axis direction in the case where the conductive shields 180A and 180B each have a wire-like shape. The conductive shields 180A and 180B each correspond to a "conductive member" according to the present disclosure. With the arrangement of the conductive shields 180A and 180B, resonance with radio waves radiated from the radiating electrode 121 can be achieved, and generation of unwanted resonance can be suppressed. Furthermore, with the arrangement of the conductive shields 180A and 180B, heat generated at the electronic components 150A and 150B can be transmitted to the outside of the antenna module 100A through the conductive shields 180A and 180B, and heat dissipation efficiency of the antenna module 100A can be improved.

When attention is paid to the conductive shield 180A, the conductive shield 180A is arranged near the RFIC 110. That is, a distance D3 between the conductive shield 180A and the RFIC 110 is shorter than a distance D2 between the conductive shield 180A and the electronic component 150A. In other words, the distance D2 is longer than the distance D3.

As described above, in the antenna module 100A, by setting the distance D2 to be longer than the distance D3, generation of unwanted resonance can be suppressed.

When attention is paid to the conductive shield 180B, the conductive shield 180B is arranged near the electronic component 150B. That is, a distance D5 between the conductive shield 180B and the electronic component 150B is shorter than a distance D4 between the conductive shield 180B and the RFIC 110. In other words, the distance D4 is longer than the distance D5.

As described above, in the antenna module 100A, by setting the distance D4 to be longer than the distance D5, the heat dissipation efficiency of the amount of heat generated at the electronic component 150A can be improved.

Each of the conductive shields 180A and 180B does not necessarily have a shape having a length in the Y-axis direction and may have a shape having a length in the X-axis direction. That is, conductive shields may be arranged in the X-axis positive direction side, the X-axis negative direction side, the Y-axis positive direction side, and the Y-axis negative direction side of the RFIC 110 in such a manner that the conductive shields surround the RFIC 110. Thus, generation of unwanted resonance can be suppressed more reliably.

THIRD EMBODIMENT

The configuration of the antenna module 100 according to the first exemplary embodiment in which the radiating electrode 121 is a single patch antenna has been described above. In a third exemplary embodiment, a configuration of an antenna module 100B including a plurality of radiating elements will be described. Redundant description of components of the antenna module 100B according to the third exemplary embodiment that have been described above in the description of components of the antenna module 100 according to the first exemplary embodiment will be omitted.

Figure 4:
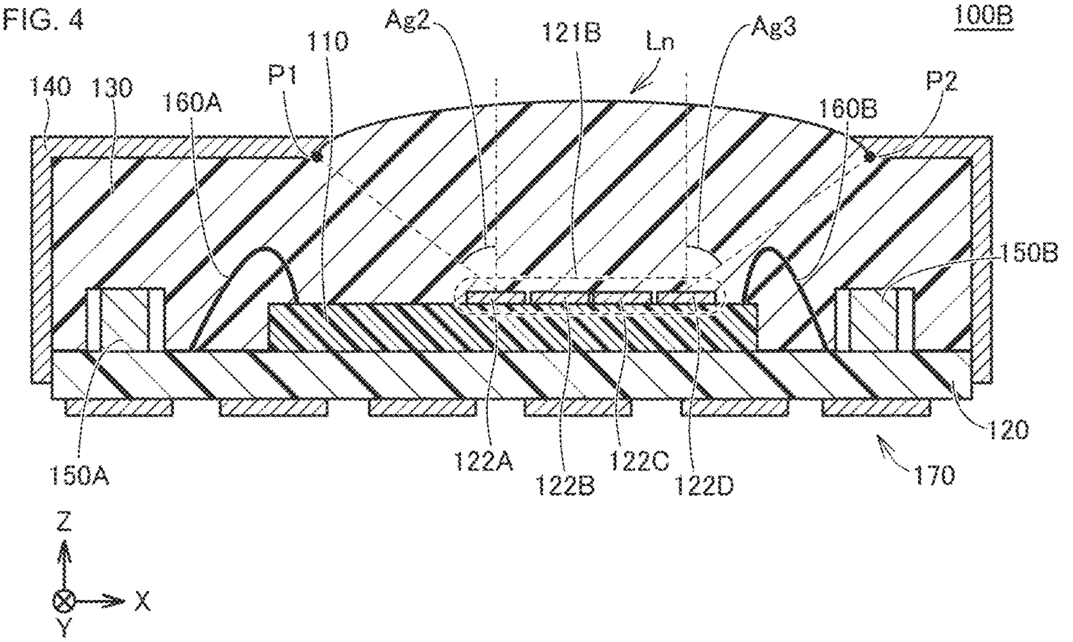
FIG. 4 is a cross-section view of an antenna module according to a third exemplary embodiment.

FIG. 4 is a cross-section view of the antenna module 100B according to the third exemplary embodiment. As illustrated in FIG. 4, in the antenna module 100B, a radiating electrode 121B is arranged on the surface Sf1 of the RFIC 110 on the Z-axis positive direction side. The radiating electrode 121B includes a plurality of radiating elements 122A to 122D. That is, the radiating electrode 121B forms an array antenna with a one-dimensional arrangement. The radiating electrode 121B is not necessarily arranged in the X-axis direction, as illustrated in FIG. 4. The radiating electrode 121B may have a two-dimensional arrangement in which radiating elements are arranged in the Y-axis direction.

An angle Ag2 is an angle formed between a direction from the radiating element 122A toward the end portion P1 and the Z-axis positive direction. An angle Ag3 is an angle formed between a direction from the radiating element 122D toward the end portion P2 and the Z-axis positive direction. Typically, as described above, the angle of radiation from a patch antenna is 120 degrees or less. Thus, in the antenna module 100B, the radiating electrode 121B and the lens Ln are arranged in such a manner that the angle obtained by adding the angle Ag3 to the angle Ag2 does not exceed 120 degrees. Thus, an unnecessary increase in the dimension of the lens Ln, which is not covered by the sputter shield 140, is prevented. That is, radio waves radiated from the bonding wire 160A and the electronic components 150A and 150B are prevented from transmitting through the lens Ln and being radiated to the outside of the antenna module 100.

Also in the antenna module 100B including an antenna of an array type as described above, with the configuration illustrated in FIG. 4, the permittivity does not change significantly in the region between the lens Ln and the radiating electrode 121B. Thus, since there is no region in which the degree of change in the permittivity is large, beam forming using a plurality of radiating elements can be achieved, while reflection of radio waves being suppressed and the characteristics of the antenna being improved.

FOURTH EMBODIMENT

The configuration of the antenna module 100 according to the first exemplary embodiment in which the lens Ln with the convex shape is formed in the mold resin 130 has been described above. In a fourth exemplary embodiment, a configuration in which a lens LnC that is a planar lens is formed in the mold resin 130 will be described. Redundant description of components of an antenna module 100C according to the fourth embodiment that have been described above in the description of components of the antenna module 100 according to the first exemplary embodiment will be omitted.

Figure 5:
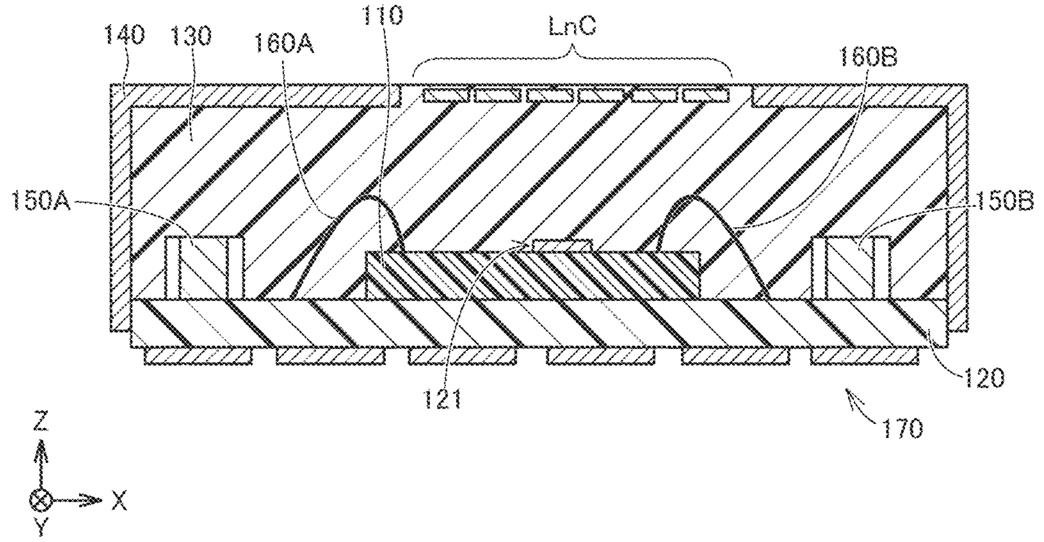
FIG. 5 is a cross-section view of an antenna module according to a fourth exemplary embodiment.

FIG. 5 is a cross-section view of the antenna module 100C according to the fourth exemplary embodiment. As illustrated in FIG. 5, in the antenna module 100C, the lens LnC formed in the mold resin 130 is a planar lens.

The planar lens is a lens formed of a metamaterial or the like and having a lens effect of a planar shape. A metamaterial represents an artificial material having an electromagnetic or optical property that is not found in a naturally occurring material. A metamaterial has a property with a negative permeability ($\mu<0$), a negative permittivity ($\varepsilon<0$), or a negative refractive index (when both permeability and permittivity are negative). Thus, even with a planar shape, a path of radio waves radiated from the radiating electrode 121 can be changed. Although the lens LnC in the example of the antenna module 100C is formed using an FSS (Frequency-Selective Surface), a planar lens formed by other processes or materials may be used.

Also in the antenna module 100C including a planar lens as described above, with the configuration illustrated in FIG. 5, the permittivity does not change significantly in the region between the lens Ln and the radiating electrode 121B. Thus, since there is no region in which the degree of change in the permittivity is large, the height can be reduced by using a planar lens, while reflection of radio waves being suppressed and the characteristics of the antenna being improved.

FIFTH EMBODIMENT

The configuration (face-up) of the antenna module 100 according to the first exemplary embodiment in which the bonding wires 160A and 160B for connecting to the mounting board 120 are connected to the surface Sf1 on which the radiating electrode 121 is arranged has been described above. In a fifth exemplary embodiment, a configuration in which a connecting member for connecting to the mounting board 120 is connected to a surface Sf2 and the radiating electrode 121 is arranged on the surface Sf1, which is different from the surface Sf2, will be described. Hereinafter, a configuration illustrated in the fifth exemplary embodiment may be referred to as face-down. Redundant description of components of an antenna module 100D according to the fifth exemplary embodiment that have been described above in the description of components of the antenna module 100 according to the first exemplary embodiment will be omitted.

Figure 6:
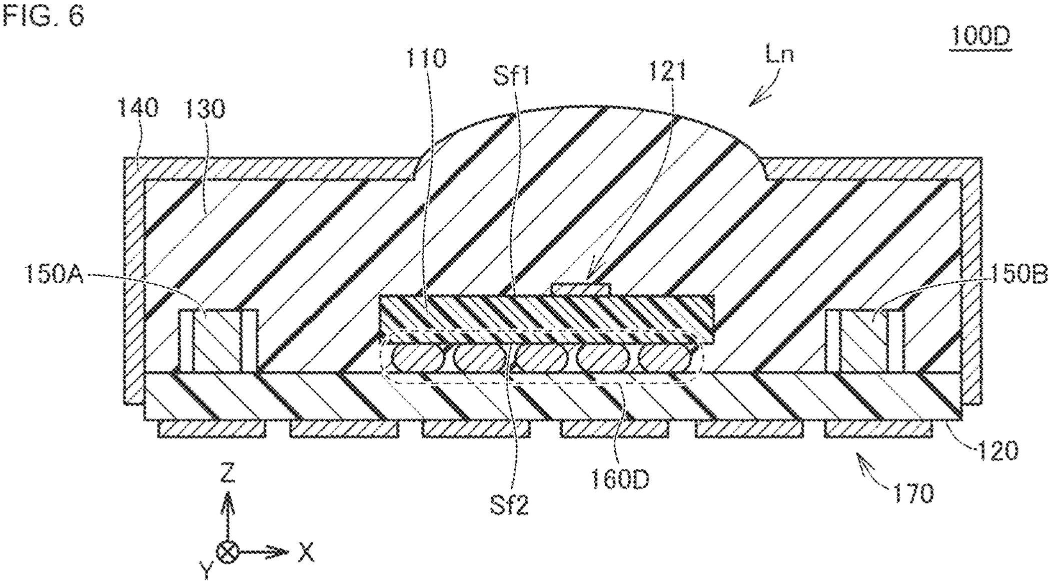
FIG. 6 is a cross-section view of an antenna module according to a fifth exemplary embodiment.

FIG. 6 is a cross-section view of the antenna module 100D according to the fifth exemplary embodiment. As illustrated in FIG. 6, in the antenna module 100D, the RFIC 110 is electrically connected to the mounting board 120 with a connecting member 160D interposed therebetween. The RFIC 110 has the surface Sf1 on the Z-axis positive direction side and the surface Sf2 on the Z-axis negative direction side, the surface Sf1 and the surface Sf2 being opposed to each other. The connecting member 160D is connected to the surface Sf2 of the RFIC 110. The radiating electrode 121 is arranged on the surface Sf1 of the RFIC 110. That is, the antenna module 100D has a configuration in which the radiating electrode 121 is arranged on the surface Sf1 that is different from the surface Sf2 connected to the mounting board 120.

In the example of FIG. 6, the connecting member 160D includes five solder bumps. The number of solder bumps included in the connecting member 160D is not limited to five as long as the connecting member 160D includes at least two solder bumps. Furthermore, the connecting member 160D may be a connecting member other than solder bumps.

Also in the antenna module 100D in which the RFIC 110 is mounted on the mounting board 120 in a face-down manner as described above, with the configuration illustrated in FIG. 6, the permittivity does not change significantly in the region between the lens Ln and the radiating electrode 121B. Thus, since there is no region in which the degree of change in the permittivity is large, the RFIC 110 can be mounted on the mounting board 120 based on the face-down configuration, while reflection of radio waves being suppressed and the characteristics of the antenna being improved.

SIXTH EMBODIMENT

The configuration of the antenna module 100D according to the fifth exemplary embodiment in which the connecting member 160D for allowing connection between the RFIC 110 and the mounting board 120 is arranged between the mounting board 120 and the RFIC 110 has been described above. In a sixth exemplary embodiment, an antenna module 100E having a configuration in which an intermediate member 190 is added to the configuration of the antenna module 100D will be described. Redundant description of components of the antenna module 100E according to the sixth exemplary embodiment that have been described above in the description of components of the antenna module 100D according to the fifth exemplary embodiment will be omitted.

Figure 7:
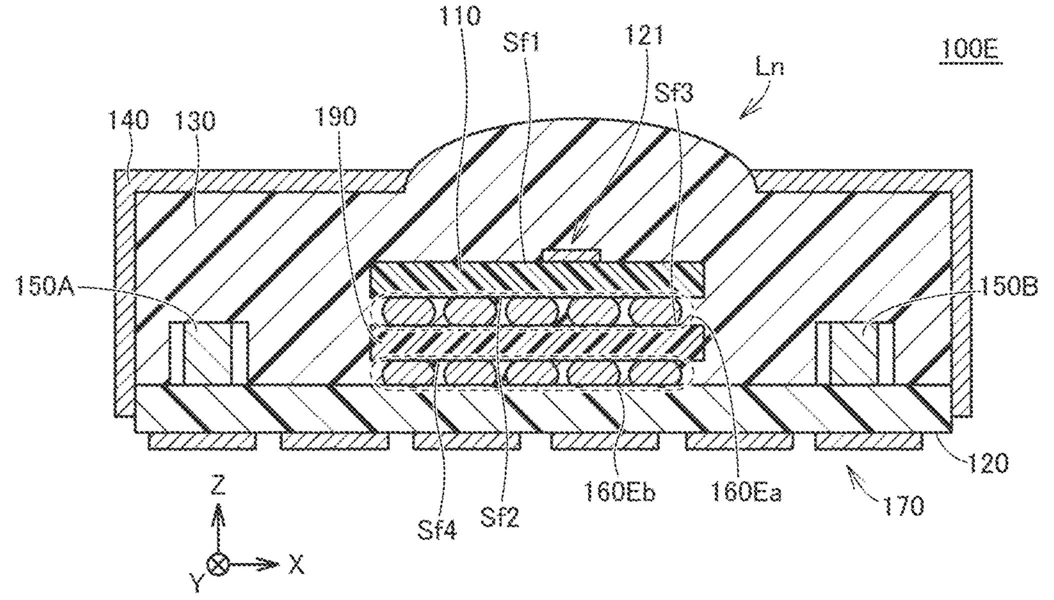
FIG. 7 is a cross-section view of an antenna module according to a sixth exemplary embodiment.

FIG. 7 is a cross-section view of the antenna module 100E according to the sixth exemplary embodiment. As illustrated in FIG. 7, in the antenna module 100E, the RFIC 110 is electrically connected to the intermediate member 190 with a connecting member 160Ea interposed therebetween. As the intermediate member 190, for example, a printed board, a ceramic board, an interposer board made of silicone or glass, a flexible board, or the like is used. The connecting member 160Ea is arranged between the surface Sf2 of the RFIC 110 and a surface Sf3 of the intermediate member 190 on the Z-axis positive direction side. The intermediate member 190 is electrically connected to the mounting board 120 with a connecting member 160Eb interposed therebetween. The connecting member 160Eb is arranged between a surface Sf4 of the intermediate member 190 on the Z-axis negative direction side and the surface of the mounting board 120 on the Z-axis positive direction side. Each of the connecting members 160Ea and 160Eb includes five solder bumps. Each of the connecting members 160Ea and 160Eb may be a connecting member other than solder bumps.

Also in the antenna module 100E in which the intermediate member 190 is arranged between the RFIC 110 and the mounting board 120 as described above, the mold resin 130 is filled in the region between the lens Ln and the radiating electrode 121. Accordingly, the permittivity does not change significantly in the region between the lens Ln and the radiating electrode 121. Therefore, there is no region in which the degree of change in the permittivity is large. Thus, the intermediate member 190 can be mounted in the antenna module 100E, while reflection of radio waves being suppressed and the characteristics of the antenna being improved.

SEVENTH EMBODIMENT

The configuration of the antenna module 100 according to the first exemplary embodiment in which the lens Ln is formed to protrude from the mold resin 130 has been described above. In a seventh exemplary embodiment, a configuration in which, by adjusting the position at which a lens LnF is to be formed, the lens LnF can be prevented from physically interfering with an object such as an external device, and the height of the entire antenna module 100F can be reduced, will be described. Redundant description of components of the antenna module 100F according to the seventh exemplary embodiment that have been described above in the description of components of the antenna module 100 according to the first exemplary embodiment will be omitted.

Figure 8:
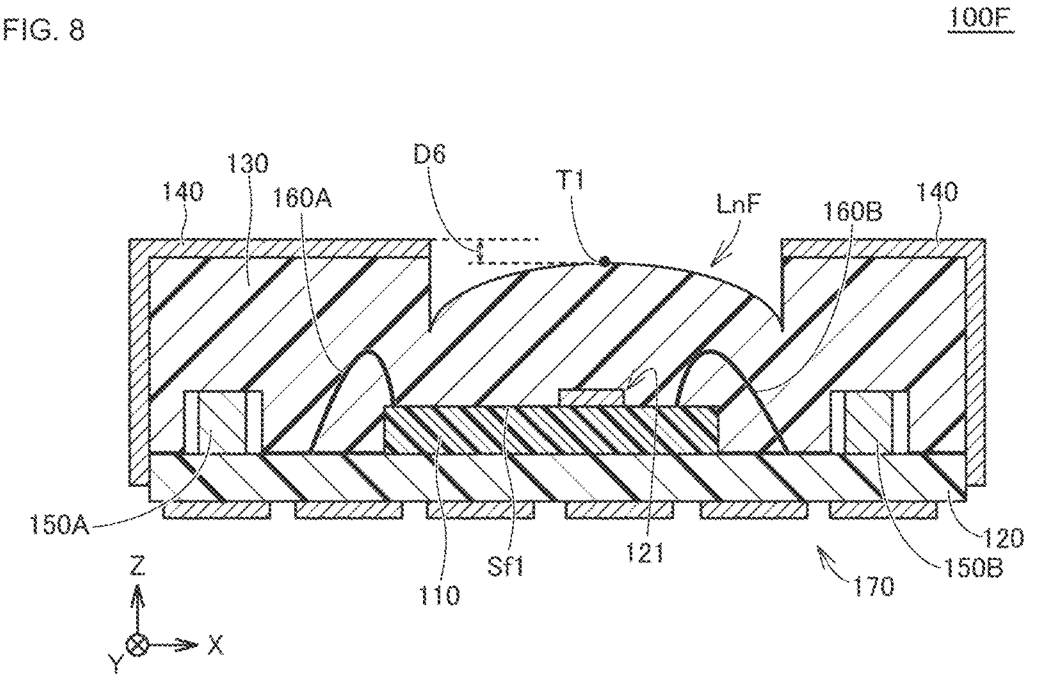
FIG. 8 is a cross-section view of an antenna module according to a seventh exemplary embodiment.

FIG. 8 is a cross-section view of the antenna module 100F according to the seventh exemplary embodiment. As illustrated in FIG. 8, compared to the lens Ln in the first embodiment, the lens LnF in the antenna module 100F is formed inside the mold resin 130. That is, a vertex T1 of the hemispherical shape of the lens LnF is located closer to the Z-axis negative direction side than the surface of the sputter shield 140 on the Z-axis positive direction side. In other words, in the Z-axis direction, the vertex T1 and the surface of the sputter shield 140 on the Z-axis positive direction side are away from each other with a distance D6 therebetween. Thus, the height of the entire antenna module 100F can be reduced, while the lens LnF being prevented from physically interfering with an object such as an external device.

Also in the antenna module 100F in which the lens LnF is arranged closer to the Z-axis negative direction side than the sputter shield 140 is, the mold resin 130 is filled in the region between the lens LnF and the radiating electrode 121. Accordingly, the permittivity does not change significantly in the region between the lens Ln and the radiating electrode 121, and there is no region in which the degree of change in the permittivity is large. Thus, in the antenna module 100F, the lens LnF can be prevented from physically interfering with an object such as an external device, while reflection of radio waves being suppressed and the characteristics of the antenna being improved. Moreover, the height of the entire antenna module 100F can be reduced.

EIGHTH EMBODIMENT

The configuration of the antenna module 100 according to the first exemplary embodiment in which the radiating electrode 121 forms a patch antenna has been described above. In an eighth exemplary embodiment, a configuration in which a radiating electrode 121G forms a dipole antenna will be described. Redundant description of components of an antenna module 100G according to the eighth exemplary embodiment that have been described above in the description of components of the antenna module 100 according to the first exemplary embodiment will be omitted.

Figure 9:
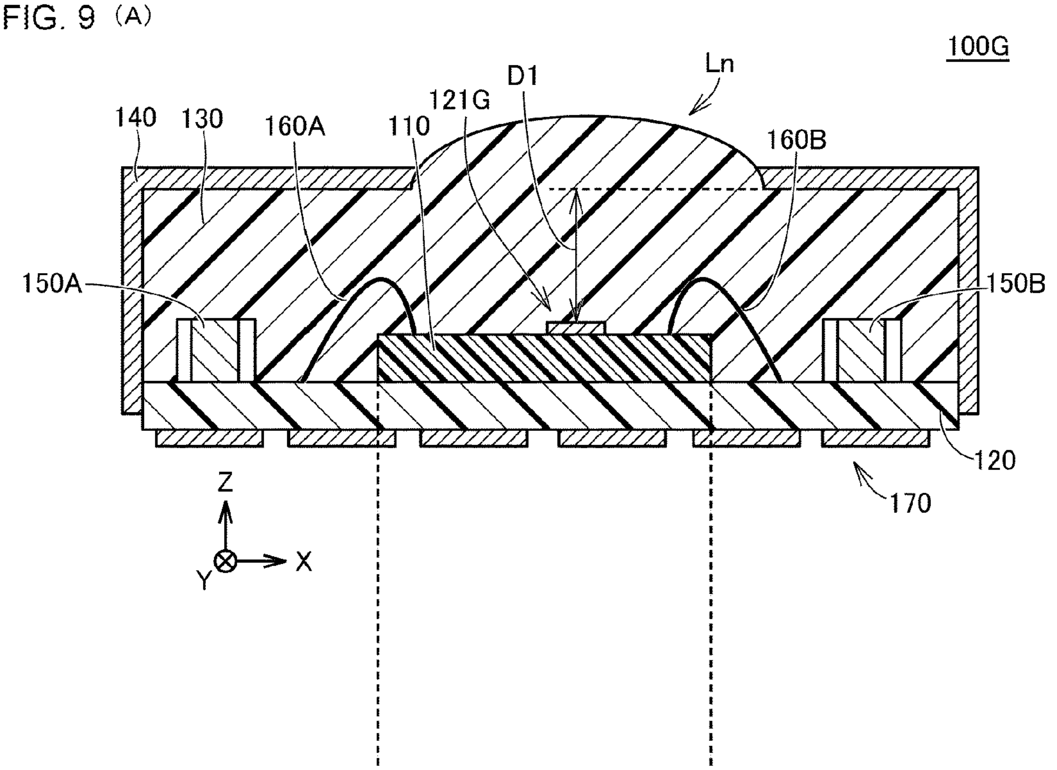
FIG. 9(A) is a cross-section view of an antenna module 100 according to an eighth exemplary embodiment.
FIG. 9(B) is a plan view of an RFIC and a radiating electrode in FIG. 9(A).
Figure 9:
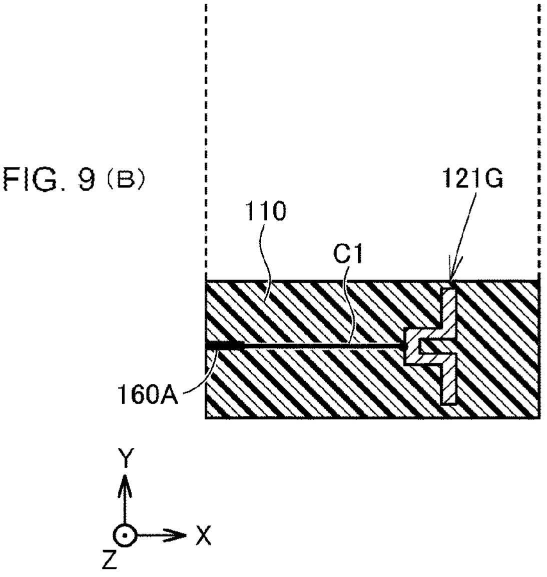

FIG. 9 includes a cross-section view (FIG. 9(A)) of the antenna module 100G according to the eighth exemplary embodiment and a plan view (FIG. 9(B)) of the RFIC 110 and the radiating electrode 121G in FIG. 9(A). As illustrated in FIG. 9, the radiating electrode 121G forms a dipole antenna. The radiating electrode 121G may be formed as an antenna other than a patch antenna and a dipole antenna. For example, the radiating electrode 121G may be formed as a slot antenna.

Also in the antenna module 100G including an antenna other than a patch antenna as described above, a region in which the degree of change in the permittivity is large is not present between the lens Ln and the radiating electrode 121G. Thus, various antennas can be mounted, while reflection of radio waves being suppressed and the characteristics of the antenna being improved.

The exemplary embodiments disclosed herein are to be considered in all respects to be illustrative and not restrictive. The scope of the present disclosure is defined by the claims, rather than the exemplary embodiments described above, and is intended to include all modifications within the meaning and scope equivalent to the scope of the claims.

REFERENCE SIGNS LIST

10 communication apparatus, 100, 100A to 100G antenna module, 110 RFIC, 111A to 111D, 113A to 113D, 117 switch, 112AR to 112DR low noise amplifier, 112AT to 112DT power amplifier, 114A to 114D attenuator, 115A to 115D phase shifter, 116 signal multiplexer/demultiplexer, 118 mixer, 119 amplifier circuit, 120 mounting board, 121, 121B, 121G radiating electrode, 122A to 122D radiating element, 130 mold resin, 140 sputter shield, 150A, 150B electronic component, 160A, 160B bonding wire, 160D, 160Ea, 160Eb connecting member, 170 connection terminal, 180A, 180B conductive shield, 190 intermediate member, 200 BBIC, Ag1 to Ag3 angle, C1 wire, D1 to D6 distance, Ln, LnC, LnF lens, P1, P2 end portion, R1, R2 region, Sf1 to Sf4 surface, T1 vertex.

The invention claimed is:

1. An antenna module comprising:

a mounting board with a flat plate shape;

a power supply circuit to supply a radio frequency signal, the power supply circuit being mounted on the mounting board;

a radiating electrode that is arranged on the power supply circuit;

a dielectric resin that is disposed to fill a region around the power supply circuit and the radiating electrode to encase the power supply circuit and the radiating electrode;

a dielectric lens form on the dielectric resin;

a conductive layer that covers exterior surfaces of the dielectric resin except where the dielectric lens is formed;

an electronic component that is mounted on the mounting board; and a conductive member that is arranged between the electronic component and the power supply circuit, wherein the dielectric lens is formed on the dielectric resin at a position overlapping the radiating electrode in plan view of the mounting board, the dielectric resin is divided in three parts including a first region in which the dielectric lens is formed and a second region other than the first region, the conductive layer covers a surface of the second region, the conductive member is connected to the conductive layer and to a ground potential, and the conductive member has one of a wall shape, a pillar shape or a mesh shape.

2. The antenna module according to claim 1, wherein the conductive layer surrounds the dielectric lens.

3. The antenna module according to claim 1, wherein a distance between the dielectric lens and the radiating electrode in a direction perpendicular to a plane of the mounting board is equal to or more than 1λ, where a wavelength of the radio frequency signal supplied from the power supply circuit is represented by λ.

4. The antenna module according to claim 1, further comprising:

a connecting member that allows connection between the mounting board and the power supply circuit, a signal being transmitted through the connecting member, wherein the conductive layer is arranged at a position overlapping the connecting member in plan view of the mounting board.

5. The antenna module according to claim 4, wherein the power supply circuit includes a first surface that is parallel to a plane of the mounting board, the radiating electrode is arranged on the first surface, and the connecting member is connected to the first surface.

6. The antenna module according to claim 1, wherein a distance between the conductive member and the electronic component is longer than a distance between the conductive member and the power supply circuit.

7. The antenna module according to claim 1, wherein a distance between the conductive member and the power supply circuit is longer than a distance between the conductive member and the electronic component.

8. The antenna module according to claim 1, wherein the dielectric lens includes, at a peripheral edge of the dielectric lens in plan view of the mounting board, a first end portion and a second end portion that is farthest away from the first end portion, and an angle formed between a first direction from the radiating electrode toward the first end portion and a second direction from the radiating electrode toward the second end portion is 120 degrees or less.

9. The antenna module according to claim 1, wherein the radiating electrode forms a patch antenna.

10. The antenna module according to claim 1 wherein the conductive layer covers surfaces of the dielectric resin that are perpendicular to the mounting board.

11. The antenna module according to claim 1, wherein the power supply circuit includes a radio frequency integrated circuit (RFIC).

* * * * *